United States Patent [19]

Sugano et al.

[11] Patent Number: 5,294,070

[45] Date of Patent: Mar. 15, 1994

[54] SEAT BELT RETRACTOR

[75] Inventors: Shuichi Sugano; Shogo Hayashi; Yoshinobu Kondoh, all of Shizuoka, Japan

[73] Assignee: Fuji Autolib Co., Ltd., Japan

[21] Appl. No.: 986,030

[22] Filed: Dec. 4, 1992

[30] Foreign Application Priority Data

Jan. 31, 1992 [JP] Japan .............................. 4-003215[U]

[51] Int. Cl.⁵ .............................................. B60R 22/38
[52] U.S. Cl. ......................... 242/107.4 A; 242/107.4 B
[58] Field of Search ......... 242/107, 107.4 R, 107.4 A, 242/107.4 B; 280/806, 807, 808

[56] References Cited

U.S. PATENT DOCUMENTS

| 3,401,979 | 9/1968 | Putsch | 297/410 |
| 3,507,539 | 4/1970 | Putsch et al. | 297/362 |
| 4,027,829 | 6/1977 | Stephenson et al. | 242/107.4 A |
| 4,164,335 | 8/1979 | Kondziola | 242/107.4 A |
| 4,467,980 | 8/1984 | Fohl | 242/107.4 B |
| 4,552,319 | 11/1985 | Gavagan et al. | 242/107.4 A |
| 4,747,562 | 5/1988 | Tsukamoto et al. | 242/107.4 R |
| 4,749,143 | 6/1988 | Tsukanoto et al. | 242/107.4 A |
| 4,767,082 | 8/1988 | Schmidt et al. | 242/107.4 A |
| 4,811,912 | 3/1989 | Takada | 242/107.4 R X |
| 4,991,874 | 2/1991 | Tsuge et al. | 242/107.4 A X |
| 4,993,656 | 2/1991 | Tsuge et al. | 242/107.4 A |

FOREIGN PATENT DOCUMENTS 2-2264 1/1990 Japan.

Primary Examiner—Daniel P. Stodola
Assistant Examiner—John P. Darling
Attorney, Agent, or Firm—Ronald P. Kananen

[57] ABSTRACT

A seat belt retractor is of a type having an emergency locking mode and an auto-locking mode. The retractor comprises a take-up shaft on which a webbing is wound. A ratchet wheel is connected to the take-up shaft to rotate therewith, and an annular cam member is connected to the take-up shaft through a speed reduction mechanism. The cam member has a first group of projections formed thereon. A switching arm is pivotally arranged in such a manner that a second group of projections formed thereon are engageable with the first group of projections. A toggle spring is used for biasing the switching arm in a given direction. A pivotal tooth member is actuated by the switching arm and engageable with the ratchet wheel. The pivotal tooth member is biased by a spring in a direction away from the ratchet wheel.

7 Claims, 6 Drawing Sheets

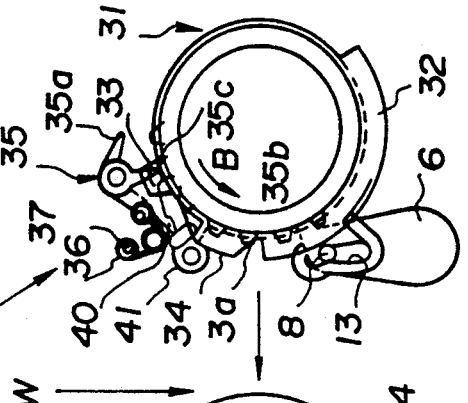
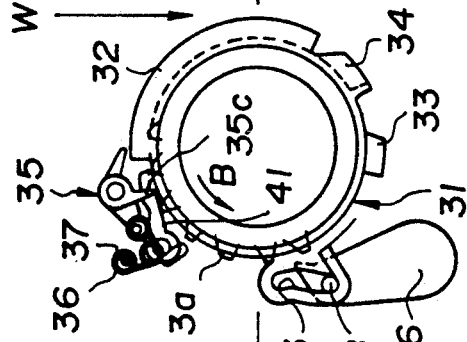
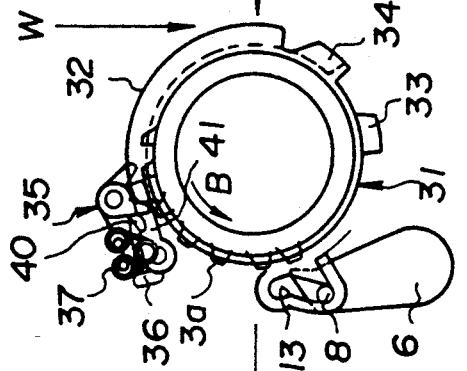
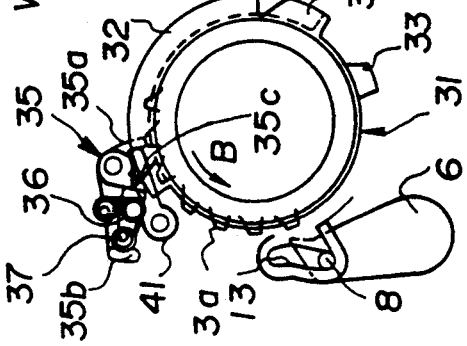

SEAT BELT RETRACTOR

BACKGROUND OF THE INVENTION

1. Field of the Invention

The present invention relates to seat belt retractors, and more particularly, to seat belt retractors of a type which has both an auto-locking mode (ALM) and an emergency locking mode (ELM).

2. Description of the Prior Art

Hitherto, various types of seat belt retractors have been proposed and put into practical use particularly in the field of wheeled motor vehicles. One of them is the type disclosed in Japanese Utility Model First Provisional Publications Nos. 63-145747 and 2-2264, which has both an auto-locking mode (ALM) and an emergency locking mode (ELM). The auto-locking mode (ALM) is the mode in which once the seat belt is loosely put on the seat occupant, the belt is automatically retracted by a degree to permit a tight fitting of the belt to the belt wearer, and the feeding of the belt from the retractor is blocked. While, the emergency locking mode is the mode in which when a certain shock is applied to the retractor due to a vehicle collision or the like, feeding of the seat belt from the retractor is suppressed thereby to prevent the belt wearer from being thrown forward.

However, in the seat belt retractors of the above-mentioned double function type, there is sometimes a difficulty in making a smoothed switching from the emergency locking mode (ELM) to the auto-locking mode (ALM) and vice versa. More specifically, when each part of the retractor fails to have exact dimension, the switching between the two modes is not smoothly carried out. Furthermore, due to their inherence which requires a complicated layout of parts, some of them are bulky in construction.

SUMMARY OF THE INVENTION

It is therefore an object of the present invention to provide a seat belt retractor of double function type, which is free of the above-mentioned drawbacks.

According to the present invention, there is provided a seat belt retractor of a type having an emergency locking mode and an auto-locking mode. The retractor comprises a take-up shaft by which a webbing is to be retracted; a ratchet wheel connected to the take-up shaft to rotate therewith; an annular cam member connected to the take-up shaft through a speed reduction mechanism, the cam member having a first group of projections formed thereon; a pivotal switching arm having a second group of projections formed thereon, the second group of projections being engageable with the first group of projections; a toggle spring for biasing the switching arm in a given direction; a pivotal tooth member actuated by the switching arm and engageable with the ratchet wheel; and biasing means for biasing the pivotal tooth member in a direction away from the ratchet wheel.

BRIEF DESCRIPTION OF THE DRAWINGS

Other objects and advantages of the present invention will become apparent from the following description when taken in conjunction with the accompanying drawings, in which:

FIGS. 7(a) to 7(g) are drawings showing various operation conditions assumed by the retractor of the invention.

DETAILED DESCRIPTION OF THE INVENTION

Figure 1:
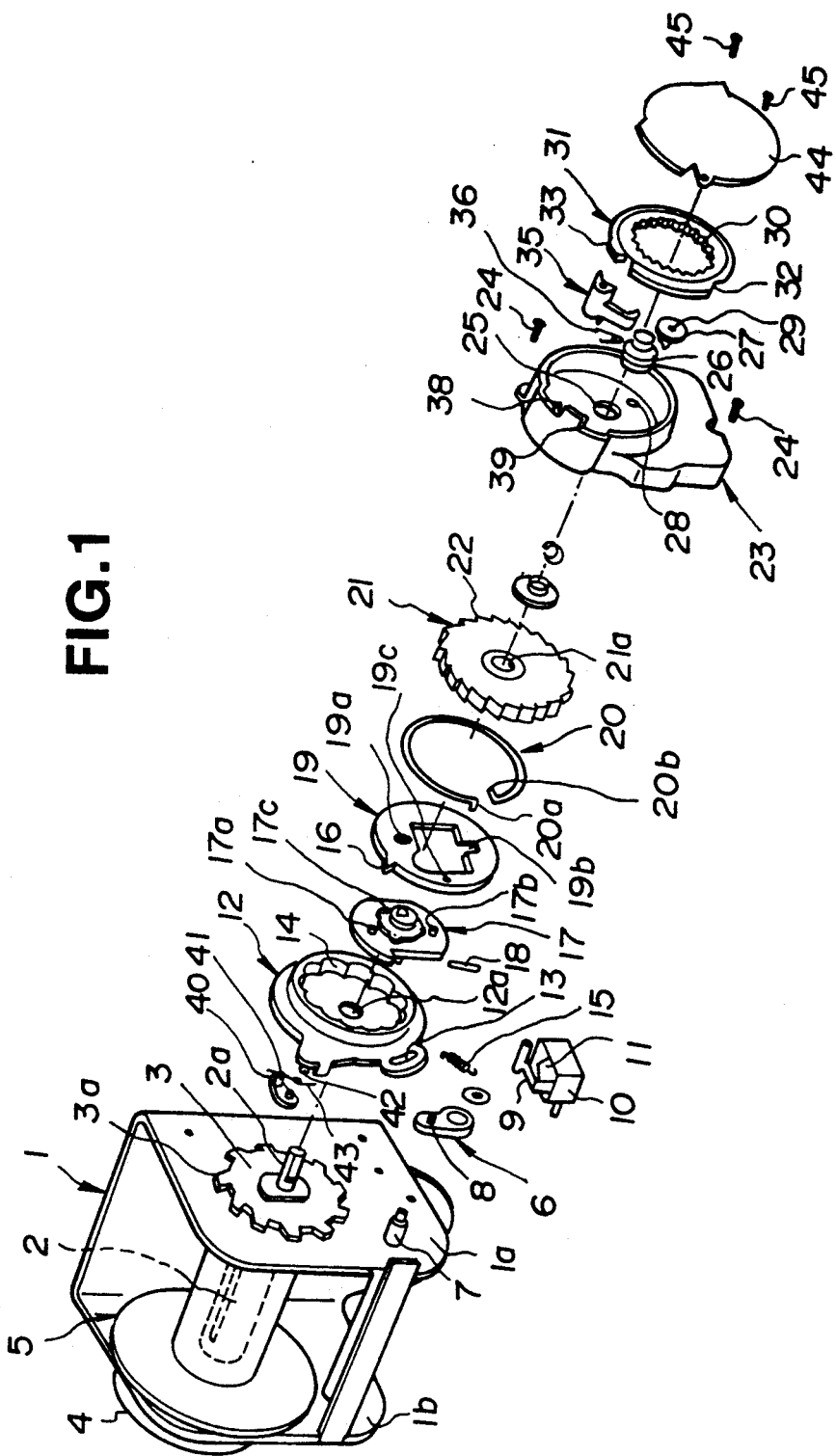
FIG. 1 is an exploded view of a seat belt retractor according to the present invention.
Figure 2:
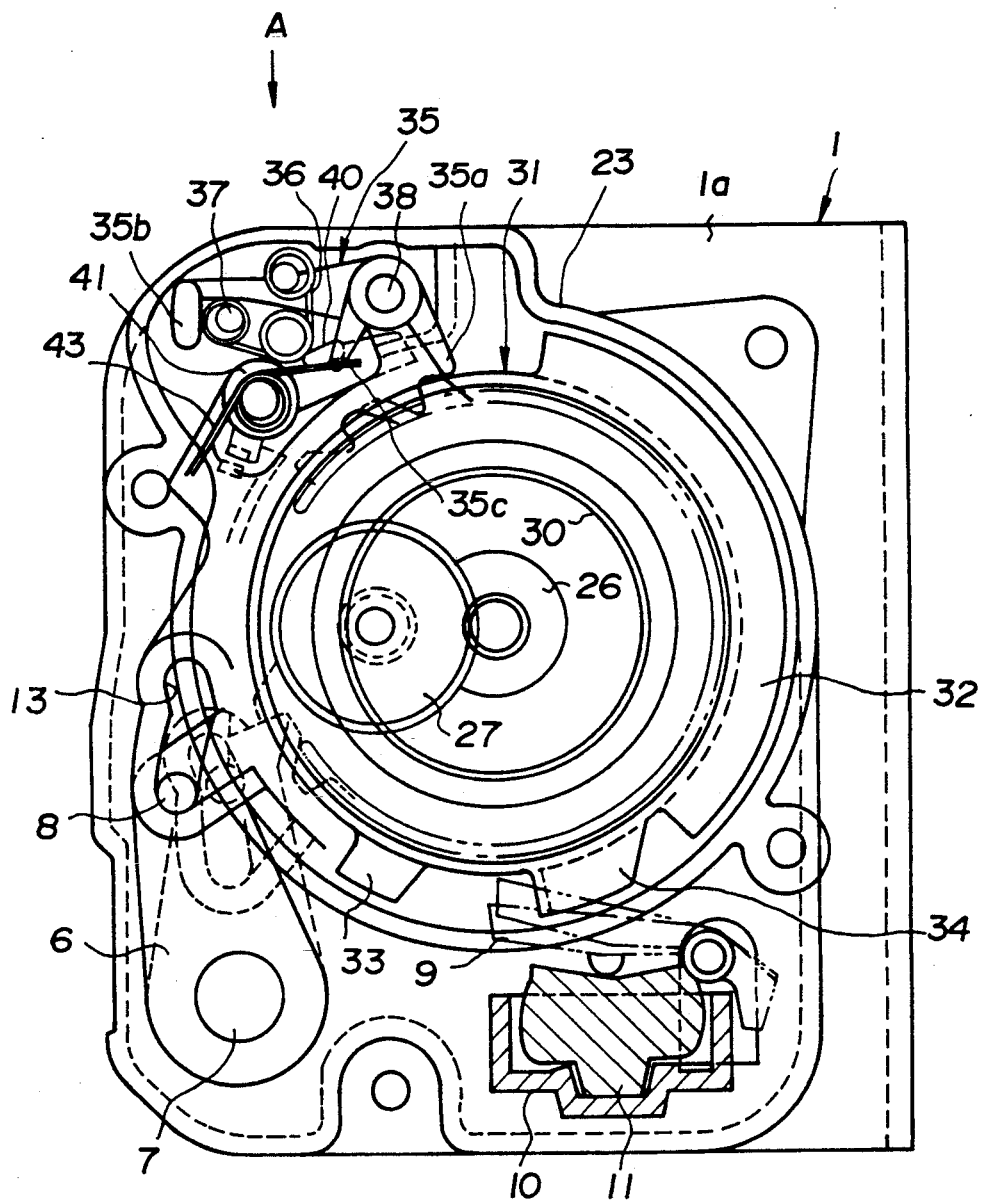
FIG. 2 is a front view of the seat belt retractor with some parts removed.
Figure 3:
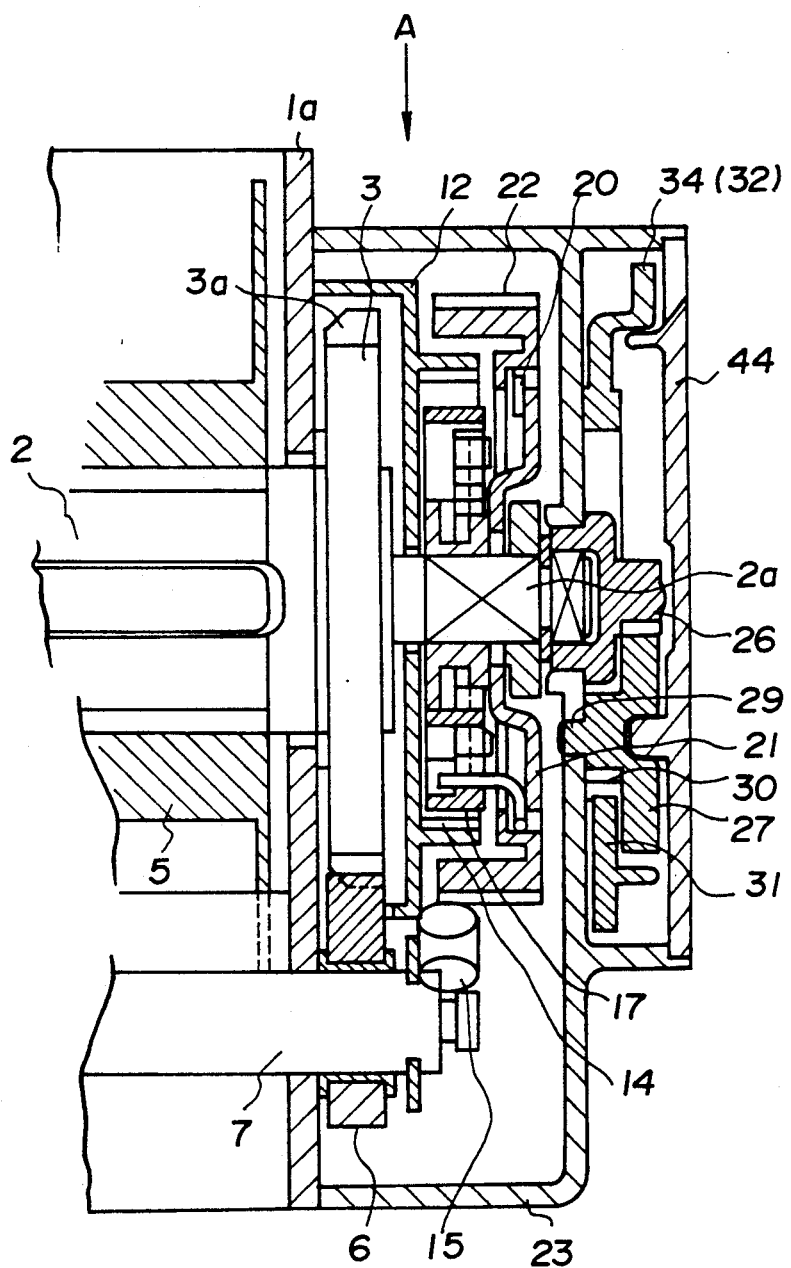
FIG. 3 is a vertically sectioned view of an essential portion of the seat belt retractor.

Referring to the drawings, particularly FIG. 1, there is shown a seat belt retractor of double function type according to the present invention.

In FIG. 1, designated by numeral 1 is a generally U-shaped housing which comprises parallel side walls 1a and 1b which are connected through a base wall (no numeral). The side walls 1a and 1b have respective openings through which a take-up shaft 2 is rotatably supported having first and second opposed end portions projected outward from the side walls 1a and 1b. To the first projected end portion of the take-up shaft 2, there is fixed a ratchet wheel 3, while, to the second projected end portion of the shaft 2, there is fixed an inner end of a belt return spring (not shown). The belt return spring is installed in a spring case 4 which is secured to the side wall 1b of the housing 1. As will become apparent as the description proceeds, the belt return spring functions to bias the take-up shaft 2 in a direction to wind or retract thereon the seat belt. A reel 5 is coaxially disposed about the take-up shaft 2 to rotate therewith. Although not shown in the drawings, a webbing (viz., seat belt) wound on the reel 5 has an inside end secured to the take-up shaft 2.

The ratchet wheel 3 has a plurality of inclined teeth 3a with which a pawl member 6 is engageable. The pawl member 6 is pivotally supported by a support pin 7 fixed to the side wall 1a of the housing 1. It is to be noted that the engagement between the pawl member 6 and the ratchet wheel 3 is so made as to block rotation of the take-up shaft 2 in the webbing taking up direction while permitting rotation in the opposite direction. The pawl member 6 has a pin 8 secured to a leading end thereof.

A so-called "stand-man box" 10 is mounted to the side wall 1a of the housing 1. The stand-man box 10 has a tooth member 9 which is engageable with ratchet teeth 22 possessed by a flywheel 21 secured to the take-up shaft 2. The stand-man box 10 is a known vehicle shock sensor. That is, when a certain shock is applied to the housing 1 due to a vehicle collision or the like, a stand-man (viz., pendulum) 11 is inclined to push the tooth member 9 to bring about a latched engagement of the tooth member 9 with the ratchet teeth 22 of the flywheel 21. With this, rotation of the take-up shaft 2 in the webbing feeding direction is blocked.

As is seen from FIG. 1, the first projected end portion of the take-up shaft 2 is formed with a diametrically reduced part 2a which has a semicircular cross section. A cam wheel 12 is rotatably disposed about the reduced part 2a of the take-up shaft 2. A center opening of the cam wheel 12 through which the reduced part 2a passes is denoted by numeral 12a. The cam wheel 12 is formed at a radially enlarged portion with an elongate opening 13 into which the pin 8 of the above-mentioned pawl member 6 is slidably inserted. As will become apparent hereinafter, when the cam wheel 12 is rotated in one direction to draw out the webbing from the reel 5, one longitudinal end of the opening 13 pulls the pin 8 causing engagement of the pawl member 6 with the ratchet wheel 3, while, when the cam wheel 12 is rotated in the other direction, the other longitudinal end of the opening 13 pulls the pin 8 thereby separating the pawl member 6 from the ratchet wheel 3.

The cam wheel 12 is provided at another radially enlarged portion with a pin 42 which projects toward the ratchet wheel 3. A tooth member 41 is pivotally supported by the pin 42 and engageable with the teeth 3a of the ratchet wheel 3. A spring 43 is arranged to bias the tooth member 41 to pivot in a direction away from the teeth 3a of the ratchet wheel 3. The tooth member 41 has a pin 40 secured thereto. The pin 40 extends in a direction away from the ratchet wheel 3.

The ratchet wheel 3, the pawl member 6 and the cam wheel 12 thus constitute a so-called "lock mechanism" which can block the rotation of the take-up shaft 2.

The cam wheel 12 is formed with a circular recess whose cylindrical outer wall is formed with teeth 14. A spring 15 extends between the cam wheel 12 and the support pin 7 to bias the cam wheel 12 to rotate in a clockwise direction in FIG. 1.

Within the circular recess of the cam wheel 12, there are disposed a hook retainer 17 and a hook member 19. The hook retainer 17 is fixed to the diametrically reduced part 2a of the take-up shaft 2 to rotate therewith in the circular recess. The hook member 19 is connected through a spring 18 to the hook retainer 17 and has a pawl 16 slidably engaging with the teeth 14 of the cam wheel 12. The hook retainer 17 has two small projections 17a and 17b which are loosely received in respective small openings 19a and 19b formed in the hook member 19. Thus, the hook member 19 is permitted to make a small rotation movement relative to the hook retainer 17 by a degree determined by the loose engagement between the projections 17a and 17b and the openings 19a and 19b. The hook retainer 17 has a shaft portion 17c provided thereon. The hook member 19 has a generally rectangular opening (no numeral) which accommodates the shaft portion 17c of the hook retainer 17. The hook member 19 has further a small hole 19c to which one end 20a of a spring 20 is hooked. The other end 20b of the spring 20 is hooked to the flywheel 21. The flywheel 21 has a center opening 21a rotatably disposed about the shaft portion 17c of the hook retainer 17. As has been mentioned hereinabove, the flywheel 21 is formed at its periphery with the ratchet teeth 22.

The hook retainer 17, the spring 18, the hook member 19, the spring 20 and the flywheel 21 constitute a so-called "webbing movement sensor".

A case 23 which covers the above-mentioned parts is secured to the side wall 1a of the housing 1 by means of connecting screws 24. The case 23 is formed with a circular recess (no numeral) and has an opening 25 through which the first projected end portion of the above-mentioned take-up shaft 2 passes.

A sun gear 26 is secured to the projected end portion of the take-up shaft 2 to rotate therewith. Meshed with the sun gear 26 is a planetary gear 27 which has a pivot shaft 29 rotatably disposed in an opening 28 formed in a bottom portion of the case 23. Thus, the planetary gear 27 is prevented from making revolution around the sun gear 26. An annular cam member 31 is rotatably received in the circular recess of the case 23. The cam member 31 has internal teeth 30 meshed with the planetary gear 27.

The sun gear 26, the planetary gear 27 and the cam member 31 constitute a speed reduction mechanism which can easily detect the rotation speed of the take-up shaft 2.

Figure 5:
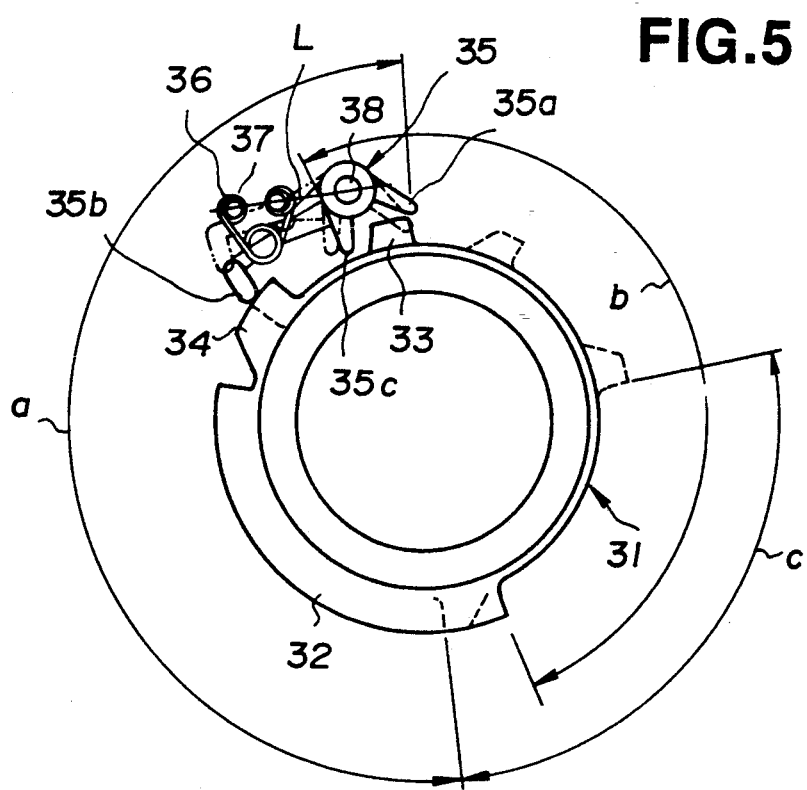
FIG. 5 is a front view of some parts of the retractor.

As is best seen from FIG. 5, the cam member 31 is formed about its periphery with first, second and third projections 32, 33 and 34. The first and third projections 32 and 34 have the same surfaces, while the second projection 33 has a different surface. The first projection 32 is longer than the other two projections 33 and 34, and the third projection 34 is located between the first and second projections 32 and 33, as shown. It is to be noted that in FIG. 5, the range denoted by reference "a" is the angular range within which the cam member 31 is rotatable when an after-mentioned auto-locking mechanism is ON, the range denoted by "b" is the angular range within which the cam member 31 is rotatable when the auto-locking mechanism is OFF, and the range denoted by "C" is the angular range within which the cam member 31 rotates when the webbing is fully retracted by the take-up shaft 2 due to OFF condition of the auto-locking mechanism.

Figure 4:
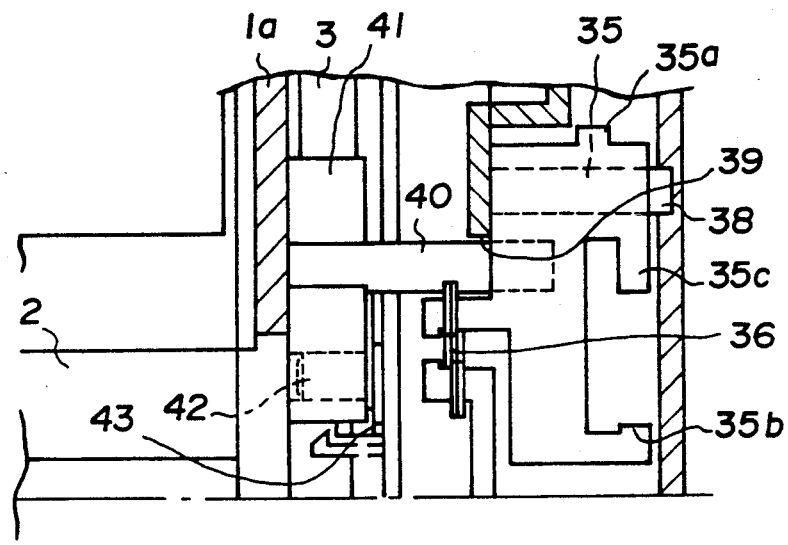
FIG. 4 is a partial view taken from the direction of the arrow "A" of FIG. 3.

As is understood from FIGS. 1, 4 and 5, a switching arm 35 engageable with the three projections 32, 33 and 34 of the cam member 31 is pivotally connected to a pin 38 secured to the case 23.

As is seen from FIGS. 4 and 5, the switching arm 35 is formed with three projections 35a, 35c and 35b which are engageable with the second, first and third projections 33, 32 and 34 of the cam member 31 respectively. As will become apparent as the description proceeds, the projections 35a, 35c, 35b, 33, 32 and 34 are so arranged as to provide the retractor with such a function that when, after full feeding of the webbing from the retractor, the webbing is retracted by a given small length, the retractor is subjected to switching from emergency locking mode (ELM) to auto-locking mode (ALM) is carried out in the retractor.

As will become apparent hereinafter, if desired, the third projection 34 of the cam member 31 and the projection 35b of the switching arm 35 may be removed! However, in this case, the switching from the emergency locking mode (ELM) to the auto-locking mode (ALM) is effected as soon as the webbing is fully fed by the retractor.

Referring back to FIG. 5, the switching arm 35 has one end of a toggle spring 36 connected thereto. The other end of the toggle spring 36 is pivotally connected to a pin 37 secured to the case 23. Thus, the toggle spring 36 can pivot about the pin 37 in a snap action manner between two positions which are opposite with respect to a line "L" which connects the pin 37 and the pin 38.

As is understood from FIGS. 1 and 4, the pin 40 of the above-mentioned tooth member 41 extends through an opening 39 of the case 23 for engagement with the switching arm 35. As is seen from FIG. 1, a lid 44 is secured to the case 23 by means of connecting screws 45.

Figure 6:
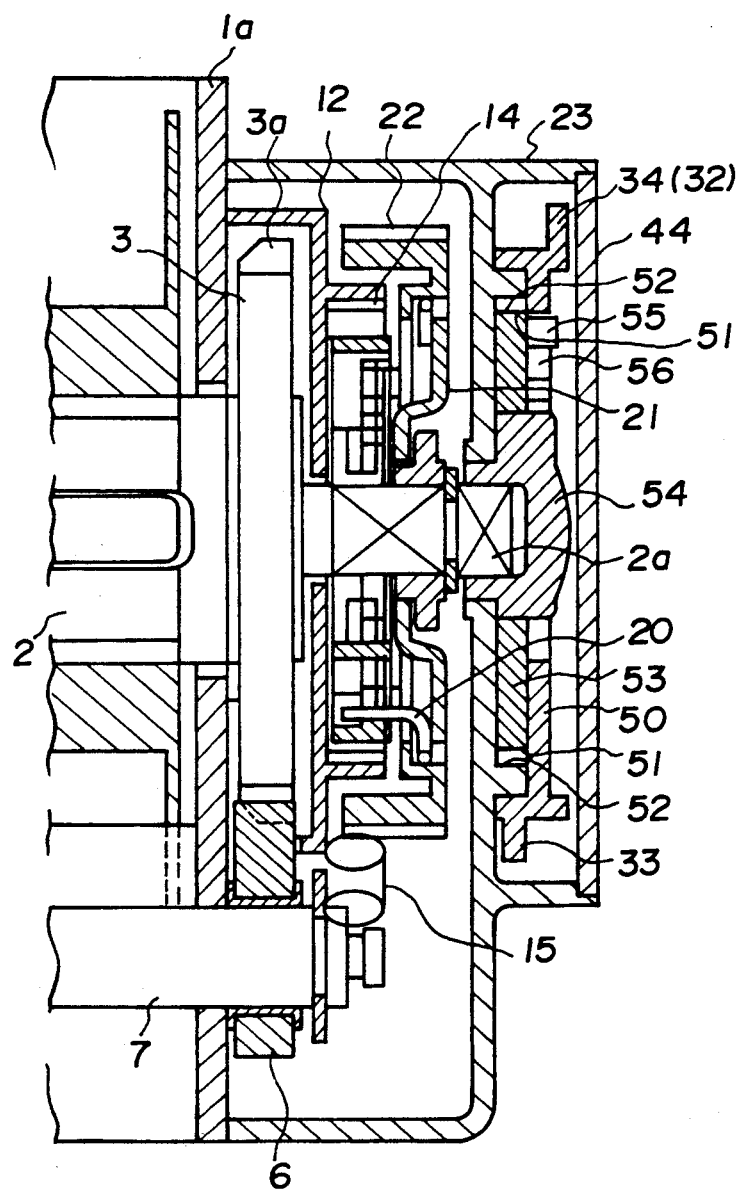
FIG. 6 is a view similar to FIG. 3, but showing a modification of a speed reduction mechanism installed in the retractor.

FIG. 6 shows a modification of the speed reduction mechanism, which is also usable in the seat belt retractor of the invention. That is, in this modification, a so-called "Taumel mechanism" is employed, which is disclosed in, for example, U.S. Pat. Nos. 3,401,979 and 3,507,539. That is, as is seen from the drawing, the case 23 is formed with internal teeth 51 with which external teeth 52 of a gear 53 are meshed. The number of the internal teeth 51 is greater than that of the external teeth 52 by at least one. The gear 53 is connected to the diametrically reduced part 2a of the take-up shaft 2 through an eccentric shaft 54. The gear 53 is formed with a projection 55 which engages with a semicircular groove 56 formed in the cam member 50. The semicircular groove 56 is concentric with the take-up shaft 2.

In the following, operation of the seat belt retractor of the present invention will be described with reference to the drawings, particularly FIG. 1 and FIGS. 7(a) to 7(g).

First, the emergency locking mode (ELM) possessed by the retractor will be explained.

For ease of understanding, the description will be commenced with respect to a condition wherein the webbing is fully retracted by the take-up shaft 2 due to the force of the belt return spring in the spring case 4. Under this condition, the pawl 16 of the hook member 19 is engaged with one of the teeth 14 of the cam wheel 12, the tooth member 9 of the stand-man box 10 is separated from the ratchet teeth 22 of the flywheel 21, and the cam member 31 assumes a position as shown in FIG. 7(a) wherein the three projections 32, 33 and 34 of the cam member 31 are not operatively engaged with the projections 35c, 35a and 35b of the switching arm 35, keeping the switching arm 35 at its neutral position.

When the webbing is pulled with a right force, the same is slowly drawn from the retractor turning the take-up shaft 2 in the belt feeding direction against the force of the belt return spring in the spring case 4. It is to be noted that the engagement of the pawl 16 of the hook member 19 with the teeth 14 of the cam wheel 12 permits such rotation of the take-up shaft 2. Due to the rotation of the take-up shaft 2, the hook retainer 17 fixed thereto is rotated in the same direction, and thus both the hook member 19 connected through the spring 18 to the hook retainer 17 and the flywheel 21 connected through the spring 20 to the hook member 19 are rotated in the same direction. Thus, the webbing can be drawn out from the retainer by a desired length.

During the rotation of the take-up shaft 2, the sun gear 26 fixed thereto is rotated in the same direction causing rotation of the planetary gear 27 in a reversed direction about the fixed position, and thus, the cam member 31 is turned but very slowly about the sun gear 26. However, during this, as is seen from FIGS. 7(a) and 7(b), the three projections 32, 33 and 34 of the cam member 31 do not make operational engagement with their counter-projections 35c, 35a and 35b of the switching arm 35, and thus, the switching arm 35 is kept in its neutral position.

When, with the webbing thus fed by a certain length, a tongue member (not shown) carried by the webbing is coupled with a buckle member (not shown) which extends from a vehicle floor and the webbing is released from hands of the belt wearer (viz., seat occupant), the webbing is automatically retracted by the spring-biased take-up shaft 2 by a length which permits a tight fitting of the belt to the belt wearer. With this, the emergency locking mode (ELM) is established.

When now a certain pulling force is applied to the webbing by the belt wearer, the take-up shaft 2 and thus the hook retainer 17 intend to rotate in the belt feeding direction. With this, the hook member 19 intends to rotate with a certain delay caused by a delayed rotation of the flywheel 21 which is connected to the hook member 19 through the spring 20. In fact, the delayed rotation of the flywheel 21 is caused by the inertia thereof. Thus, the hook member 19 makes a slight movement in the circular recess of the cam wheel 12 bringing the pawl 16 thereof into latching engagement with one of the teeth 14 of the cam wheel 12. With this, the cam wheel 12 is forced to rotate but slightly against the force of the spring 15 in a direction to cause the elongate opening 13 thereof to bring, through the pin 8, the pawl member 6 into latching engagement with one of the inclined teeth 3a of the ratchet wheel 3. Thus, upon this, the take-up shaft 2 is prevented from feeding the webbing therefrom. Thus, the belt wearer is tightly restrained by the safety belt.

While, when, with the seat belt being tightly fitted to the seat occupant, an abnormally big shock is applied to the vehicle body due to a vehicle collision or the like, the stand-man 11 of the stand-man box 10 is forced to incline. With this, the tooth member 9 is pushed and brought into latching engagement with one of the ratchet teeth 22 of the flywheel 21. With this, like in the above-mentioned case, the take-up shaft 2 is blocked from feeding the webbing therefrom.

In the following, the auto-locking mode (ALM) will be explained.

First, the webbing must be fully drawn out from the retractor by the belt wearer under the emergency locking mode (ELM).

That is, when the webbing is softly pulled, a certain length of the same is slowly drawn out from the retractor turning the take-up shaft 2 in the belt feeding direction against the force of the belt return spring. During this, the hook retainer 17, the hook member 19 and the flywheel 21 are rotated in the same direction, and at the same time, the sun gear 26 fixed to the take-up shaft 2 is rotated in the same direction turning, through the planetary gear 27, the cam member 31 thereabout.

As is understood from FIGS. 7(a) to 7(c), during such rotation, the second projection 33 of the cam member 31 pushes the projection 35a of the switching arm 35 thereby to pivot the switching arm 35. The direction in which the cam member 31 rotates under such condition is designated by the arrow "A". During the rotation of the cam member 31, the toggle spring 36 is pivoted. When, as has been mentioned hereinafore, one end portion of the toggle spring 36 is shifted in a snap action manner from one position to another position with respect to the line "L" (see FIG. 5), the switching arm 35 becomes biased toward the cam member 31.

When, as is seen from FIG. 7(c), the webbing is further pulled in the direction of the arrow "D" and finally drawn out fully from the retractor, the projection 35b of the switching arm 35 is brought into engagement with the third projection 34 of the cam member 31. Under this condition, the tooth member 41 is kept apart from the inclined teeth 3a of the ratchet wheel 3.

When, thereafter, the fully drawn webbing is released from the hands of the belt wearer, the webbing starts to be retracted by the take-up shaft 2 due to the force of the belt return spring. When thus the webbing is somewhat retracted, the cam member 31 is forced to turn in a reversed direction, that is, in the direction of the arrow "B" in FIG. 7(d). Upon this, the third projection 34 of the cam member 31 is separated from the projection 35b of the switching arm 35, and the switching arm 35 pushes the pin 40 of the tooth member 41 bringing the tooth member 41 into engagement with the inclined teeth 3a of the ratchet wheel 3, and the cam wheel 12 is pivoted causing the elongate opening 13 thereof to bring, through the pin 8, the pawl member 6 into latching engagement with one of the inclined teeth 3a of the ratchet wheel 3.

As will be understood from the above, in the present invention, in order to switch the mode of the retractor from the emergency locking mode (ELM) to the auto-locking mode (ALM), a slight retraction of the webbing is needed after full feeding of the webbing from the retractor.

Thereafter, as is seen from FIG. 7(e), the webbing is retracted by the take-up shaft 2 by the force of the belt return spring. During this, the pawl member 6 returns to its original position due to returning of the cam wheel 12 to its original position by the force of the spring 15. Under this condition, the engagement of the tooth member 41 with the inclined teeth 3a of the ratchet wheel permits the rotation of the take-up shaft 2 in the belt retracting direction. However, the belt feeding rotation of the take-up shaft 2 is blocked by such engagement.

Thus, when the retractor of the invention is used for binding an auxiliary seat, such as a child seat or the like, to a motor vehicle seat, the auxiliary seat can be tightly fitted to the vehicle seat without a slack of the belt.

When thereafter the webbing is further retracted by a certain length, the cam member 31 is further turned as is seen from FIG. 7(f), so that the first longer projection 32 is brought into contact with the projection 35c of the switching arm 35 thereby pushing the projection 35c in a radial outward direction of the cam member 31. With this, the end portion of the toggle spring 36 is shifted in a snap action manner to the opposite position returning the switching arm 35 to the original position. Thus, as is seen from FIG. 7(g), the pin 40 of the tooth member 41 is released from switching arm 35 and thus the tooth member 41 is released from the inclined teeth 3a of the ratchet wheel 3.

Accordingly, when the webbing is retracted by the retractor by a predetermined length, the retractor can assume the emergency locking mode (ELM) again.

In the following, advantages of the present invention will be described.

As has been described in the above, in order to switch the mode of the retractor from the emergency locking mode (ELM) to the auto-locking mode (ALM), a slight retraction of the webbing is needed after full feeding of the webbing from the retractor. This can relax the dimensional tolerance of the parts of the retractor, and thus the switching from the ELM to ALM and vice versa is assuredly carried out.

By using the auto-locking mode (ALM) of the retractor, an auxiliary seat, such as a child seat or the like, can be tightly fitted to a motor vehicle seat by the seat belt extending from the retractor. Of course, the emergency locking mode (ELM) is kept when the seat belt properly restrains the seat occupant.

Due to the pivotal arrangement of the switching arm 35, the force needed for moving the same is small. Thus, the feeding and retracting of the webbing from and by the take-up shaft 2 are hardly affected by the switching arm 35. Because a tooth member for the auto-locking mode is biased by a biasing spring, the range within which the auto-locking mode is operated can be changed by only changing the position of the projections 32, 33 and 34 of the cam member 31. Furthermore, since the projections 32, 33 and 34 are arranged on the peripheral edge of the annular cam member 31, the thickness of the mechanism can be reduced.

What is claimed is:

1. A seat belt retractor of a type having an emergency locking mode and an auto-locking mode, said retractor comprising:

a take-up shaft by which a webbing is to be retracted;

a ratchet wheel connected to said take-up shaft to rotate therewith;

an annular cam member connected to said take-up shaft through a speed reduction mechanism, said cam member having a first group of projections formed thereon;

a pivotal switching arm having a second group of projections formed thereon, said second group of projections being engageable with said first group of projections;

a toggle spring for biasing said switching arm in a given direction;

a cam wheel rotatably disposed about said take-up shaft;

a pivotal tooth member actuated by said switching arm and engageable with said ratchet wheel, said pivotal tooth member being pivotally connected to said cam wheel; and biasing means for biasing said pivotal tooth member in a direction away from said ratchet wheel, wherein said first and second groups of projections are arranged in such a manner that when, after full feeding of the webbing from said take-up shaft, the webbing is retracted by the take-up shaft by a given small length, the retractor is subjected to switching from the emergency locking mode to the auto-locking mode.

2. A seat belt retractor as claimed in claim 1, in which said cam wheel is formed with an elongate opening with which a pivotal pawl member is slidably engaged, said pawl member being latchingly engageable with said ratchet wheel.

3. A seat belt retractor as claimed in claim 2, further comprising:

a hook retainer connected to said take-up shaft to rotate therewith;

a hook member connected to said hook retainer through a spring interposed therebetween, said hook retainer and said hook member being rotatably installed in a circular recess formed in said cam wheel, said hook member having a pawl which is slidably engaged with internal teeth possessed by a cylindrical outer wall of said circular cress;

a flywheel rotatably disposed about a shaft portion possessed by said hook retainer, said flywheel being formed at its periphery with ratchet teeth;

a spring disposed between said hook member and said flywheel; and a vehicle shock sensor having a tooth member, said tooth member being latchingly engaged with said ratchet teeth of said flywheel when abnormally big shock is applied to said sensor.

4. A seat belt retractor as claimed in claim 3, in which said hook retainer is formed with two projections and said hook member is formed with two openings, said two projections being loosely engaged with said two openings.

5. A seat belt retractor as claimed in claim 1, in which said speed reduction mechanism comprises:

a sun gear coaxially fixed to said take-up shaft to rotate therewith;

a pinion gear meshed with said sun gear, said pinion gear being arranged to rotate about a fixed axis; and a ring gear portion defined by said annular cam member, said ring gear portion being meshed with said pinion gear.

6. A seat belt retractor as claimed in claim 1, in which said speed reduction mechanism comprises:

an externally toothed gear member which is connected to said take-up shaft through an eccentric shaft; and an internally toothed gear defined by said annular cam member and meshed with said externally toothed gear member, the number of the teeth of said internally toothed gear being greater than that of said externally toothed gear member by one.

7. A seat belt retractor of a type having an emergency locking mode and an auto-locking mode, said retractor comprising:

a take-up shaft by which a webbing is to be retracted;

a ratchet wheel connected to said take-up shaft to rotate therewith;

an annular cam member connected to said take-up shaft through a speed reduction mechanism, said cam member having a first group of projections formed thereon;

a pivotal switching arm having a second group of projections formed thereon, said second group of projections being engageable with said first group of projections;

a toggle spring for biasing said switching arm in a given direction;

a pivotal tooth member actuated by said switching arm and engageable with said ratchet wheel; and biasing means for biasing said pivotal tooth member in a direction away from said ratchet wheel;

wherein said first and second groups of projections are arranged in such a manner that when, after full feeding of the webbing from said take-up shaft, the webbing is retracted by the take-up shaft by a given small length, the retractor is subjected to switching from the emergency locking mode to the auto-locking mode, and wherein said speed reduction mechanism comprises an externally toothed gear member which is connected to said take-up shaft through an eccentric shaft; and an internally toothed gear defined by said annular cam member and meshed with said externally toothed gear member, the number of the teeth of said internally toothed gear being greater than that of said externally toothed gear member by one.

* * * * *